July 26, 1966 — H. COHEN — 3,262,327
CONTROL APPARATUS
Filed March 6, 1964 — 2 Sheets-Sheet 1

INVENTOR.
HARLEY COHEN
BY Roger W. Jensen
ATTORNEY

July 26, 1966  H. COHEN  3,262,327
CONTROL APPARATUS
Filed March 6, 1964  2 Sheets-Sheet 2
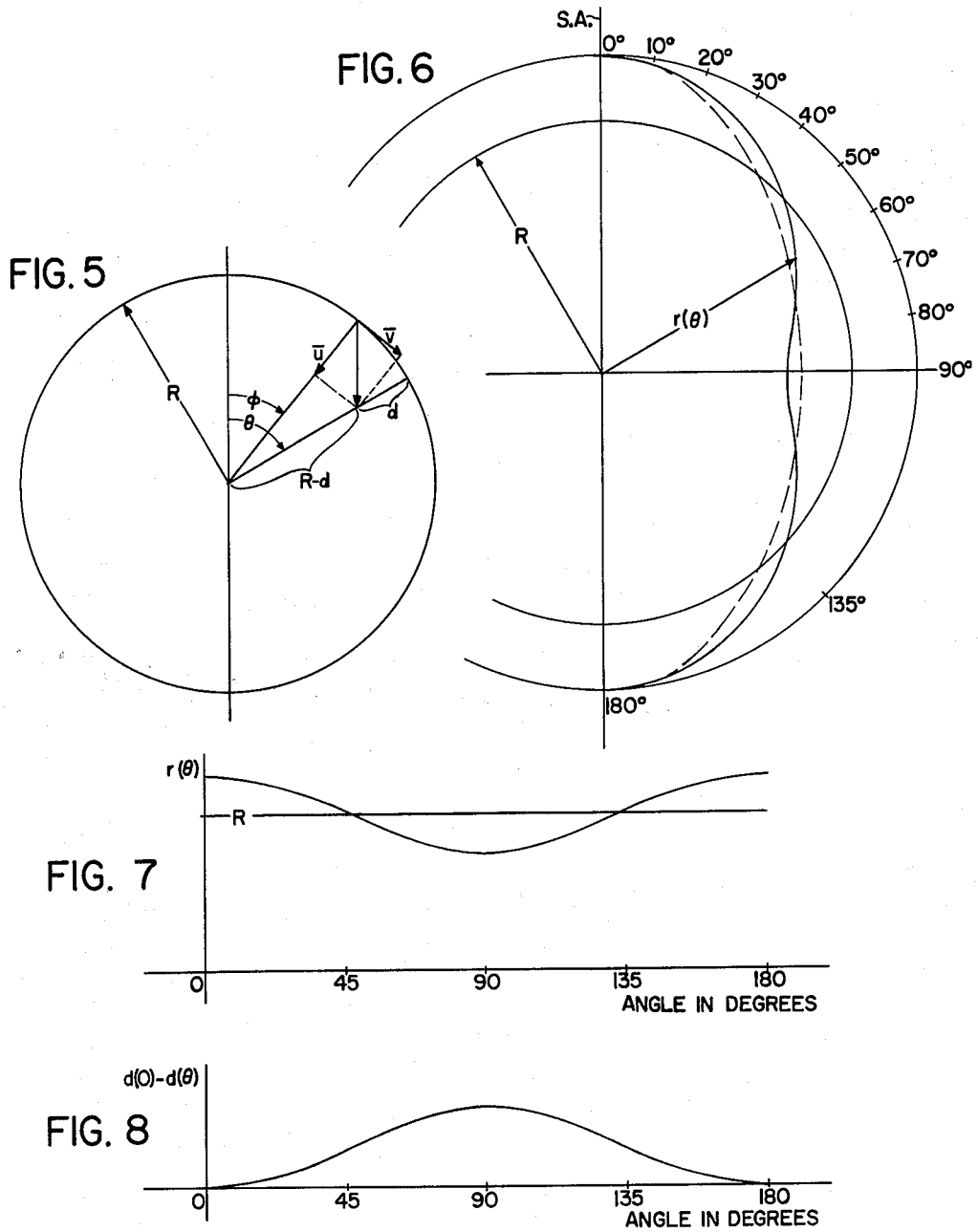
INVENTOR.
HARLEY COHEN
BY Roger W. Hensen
ATTORNEY United States Patent Office 3,262,327
Patented July 26, 1966

3,262,327
CONTROL APPARATUS
Harley Cohen, Minneapolis, Minn., assignor to
Honeywell Inc., a corporation of Delaware
Filed Mar. 6, 1964, Ser. No. 349,808
10 Claims. (Cl. 74—5)

This invention pertains to rotating spherical members. More particularly, the present invention pertains to inertial instruments in which the inertial member is a sphere.

In the inertial instrument, in which a spherical inertial member is supported by means of fields, the effects of friction or other physical interaction between the member and its supporting structure are generally reduced. An example is the recently developed electrostatically supported gyroscope (ESG) in which the member is supported by means of electric fields. In the ESG it has been found that the friction and all interaction between the member and the surrounding envelope comprised of supporting electrodes is virtually eliminated. This creates a possibility for an extremely accurate instrument.

A limitation on the accuracy of any gyroscopic inertial instrument is the drift of the spin axis of the inertial member. This means that rather than maintain a fixed direction in space, as is desirable and on which presumption the operation of a gyroscope is based, the spin axis will change its direction because of the action of certain undesirable forces on the member. These undesirable forces come from various sources including friction and mass unbalance of the inertial member. In conventional gyroscopes friction will be the dominating factor. In the ESG, due to the unique supporting means, friction becomes negligible and mass unbalance of the member becomes one of the limitations on its operation. An additional problem is given rise in ESG by the very nature of the support. The electric forces act on the member at right angles to the surface of the member since the member is a conductor. It follows that in a spherical member all the lines of force will intersect at the center of the inertial member, if indeed the inertial member is a perfect sphere. If this is so and the member is properly balanced, the geometric center of the member and its center of mass will coincide. Any deviation of the geometry of the member from a spherical shape, however, will result in the lines of force not intersecting at the geometric center and not acting through the center of mass. This in turn results in a torque on the member, causing the member to precess or drift.

In the operating mode of the electrostatic gyroscope the inertial member rotates at a rather high angular velocity. Experience has shown that an inertial member which in its static condition has been shaped to as nearly a perfect sphere as the present day techniques allow will not maintain its sphericity when spinning in the operating or dynamic mode. Rather, the member deforms into an oblate spheroid. This deformation of the inertial member at operating angular velocities is due to the centrifugal forces acting on the mass of the member. The tendency is for the member to expand in the directions away from the spin axes and to contract in the direction along the spin axis. This eccentricity or lack of sphericity will disturb the direction of the electric force vectors so that they will not pass through the center of the inertial member, thereby introducing torques and drift.

Various methods and techniques of compensation have been proposed and attempted without the desired degree of success.

The greatest difficulty was that there was no known way of predicting the amount and the geometry of the deformation. The present invention solved the problem with remarkable success by making it possible to mathematically predict with precision the deformation of the member and providing that the member in the static condition be preshaped such that it will deform into or assume the form of a substantially perfect sphere when the member is spinning at a particular predetermined angular velocity.

A specific embodiment of the present invention also provides that the internal cavity of the member be a prolate spheroid with its axis of symmetry along the desired spin axis of the member. The shaped interior gives the member a preferred spin axis of maximum moment of inertia and also provides a desired ratio of maximum to minimum principle moments of inertia necessary for rotor stability.

It is therefore an object of this invention to provide an improved inertial instrument.

More particularly it is the object of the present invention to provide an inertial member for a field supported gyroscope, which will at the operating angular velocity assume the shape of a sphere.

These and further objects will become apparent to those skilled in the art upon consideration of the accompanying specification, claims, and drawings of which:

Figure 9:
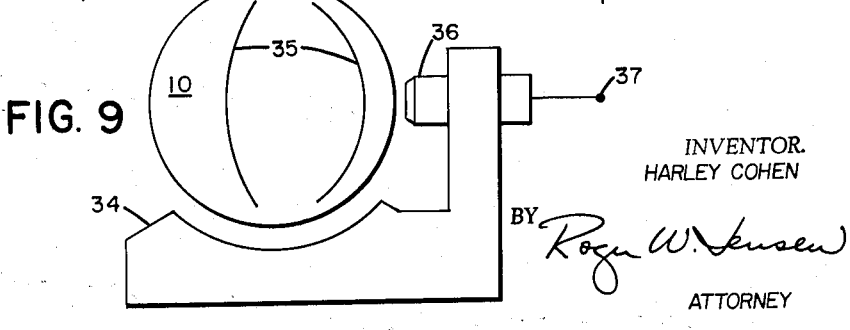

FIGURE 5 graphically illustrates the distortion of a spherical member at operating angular velocities;

FIGURE 6 illustrates the variation of the radius of the member with the latitude in an inertial member preshaped according to the teaching of the present invention;

FIGURE 7 shows graphically the variation of the magnitude of the radius of a preshaped rotor as function of the latitude;

FIGURE 8 shows graphically how much material should be removed from a spherical member at various latitudes, to arrive at the properly preshaped member; and FIGURE 9 is a schematic representation of an inertial instrument in which the present invention finds application.

Figure 1:
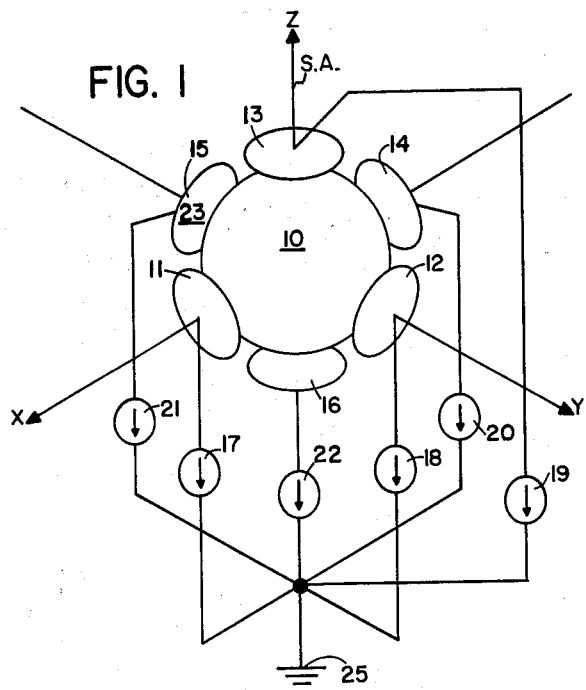
FIGURE 1 is a schematic representation of electric field support for a gyroscope.

Referring now to FIGURE 1, a spherical inertial member 10 is surrounded by six electrically isolated electrodes 11, 12, 13, 14, 15 and 16 outlining spherical cavity 23 with a radius somewhat larger than the radius of inertial member 10. Current generators 17, 18, 19, 20, 21 and 22 are connected to electrodes 11, 12, 13, 14, 15 and 16 at ground 25 respectively.

Electrodes 11 and 14, 12 and 15, 13 and 16 each form an electrode pair with the two electrodes of each being diametrically opposed so that a straight line joining the geometric centers of the two electrodes of each pair passes substantially through the center of electrode cavity 23. The three axes of the three pairs of electrodes are substantially orthogonal to each other and intersect each other at the center of the electrode cavity 23. The three axes are labeled X, Y and Z, the X axis being associated with electrodes 11 and 14, the Y axis being associated with electrodes 12 and 15, and the Z axis being associated with electrodes 13 and 16. The field created between each electrode and inertial member 10 by the respective current generators is controlled so as to continually force the inertial member 10 towards the center of the electrode cavity. An example of the electrostatic suspension system can be found in Patent 3,003,356, issuing October 10, 1961.

Figure 2:
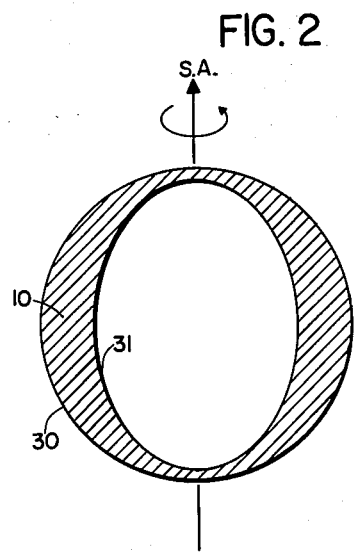
FIGURE 2 is a cross-sectional view of a spherical member for a gyroscope having a preferred spin axis.

FIGURE 2 illustrates a typical intertial member 10 which at operating angular velocities has a spherical external surface 30 and an internal cavity in the shape of prolate spheroid bounded by surface 31. This spheroid has its major symmetry axis parallel to the spin axis of the inertial member 10 and gives the inertial member 10 a preferred spin axis which is necessary for rotor stability.

Figure 3:
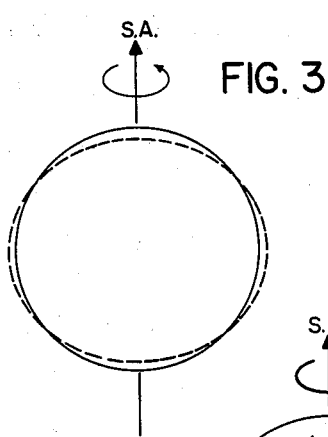
FIGURE 3 illustrates the distortion of a spherical member at high angular velocities.
Figure 4:
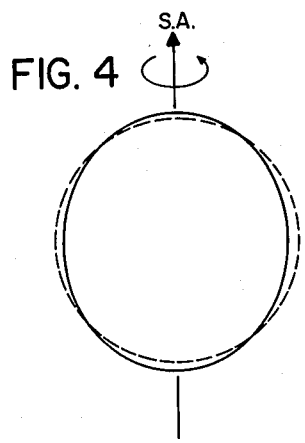
FIGURE 4 shows a properly preshaped member which will at operating angular velocities deform into a sphere.

FIGURES 3 and 4 illustrate the significance of the present invention. In FIGURE 3 an inertial member, which at rest has a substantially spherical shape, is shown to deform into an oblate spheroid at higher angular velocities. The deformed member is shown with a dotted line. FIGURE 4 shows similar effect of angular velocity on inertial member with the difference, however, that the intial shape of the member is such that it will assume a spherical shape at a particular angular velocity.

The rotor deformation can be described by a set of mathematical expressions the understanding of which will be facilitated by reference to FIGURE 5. $u$ is deformation inward along the radius and $v$ is deformation tangential to the outer surface away from the spin axis and co-planar with the spin axis. It has been found that $u$ and $v$ can be described by $$u = \frac{\rho \omega^2 R^3}{E}[1+v) \cos^2 \phi - \sin^2 \phi]$$

and $$v = \frac{\rho \omega^2 R^3}{E}[(1+v) \sin \phi \cos \phi]$$

where $\phi$ is the angle of the particular point from the spin axis; $\rho$, $E$, and $v$ are rotor material density, Young's modulus, and Poisson's ratio respectively; and $R$ is the radius of the spherical rotor.

Taking into account the order of magnitude of the deformation being considered and the accuracy to which these can be measured it can be assumed that in FIGURE 5

$$d = u$$
$$\theta = \phi$$

and $$v = 0$$

The equation describing the distortion of the member as a function of $\theta$ for any particular constant $\omega$ becomes $$d(\theta) = \frac{\rho \omega^2 R^3}{E}[(1+v) \cos^2 \theta - \sin^2 \theta]$$

where $\omega$ is the angular velocity of the inertial member, chosen in advance, at which it will be operated in its dynamic state. A spherical member with radius $R$ will therefrom deform into a shape $$r(\theta) = R + d(\theta)$$

where $r(\theta)$ is the distance of a point on the surface of the distorted member to the center of the sphere of radius $R$.

If now the member is in its static or non-rotating state preshaped according to:

$$r(\theta) = R - d(\theta)$$

or $$r(\theta) = R - \frac{\rho \omega^2 R^3}{E}[(1+v) \cos^2 \theta - \sin^2 \theta]$$

where $R$ is the desired radius of the member in the rotating or dynamic mode and $d(\theta)$ is evaluated as described above at an $\omega$ which corresponds to the contemplated operating angular velocity of the member, the member will at said $\omega$ assume a shape of a substantially perfect sphere.

FIGURE 6 illustrates in exaggerated form the surface contour of the preshaped rotor as a function of latitude according to the teaching of the present invention. It should be noted that the preshaped rotor does not merely have the shape of a prolate spheroid. Rather it deviates considerably from the shape of a prolate spheroid especially in the equatorial region, as is clearly shown in FIGURE 6. The cross-section of the rotor normal to the spin axis at any particular latitude has a circular shape. The length of the radius as a function of the latitude angle is more clearly shown in FIGURE 7.

For certain applications sufficient accuracy is obtained by approximating the curve in FIGURE 6 by an ellipse as illustrated by the dotted line in FIGURE 6, so that a compensated member in a static condition would be an oblate spheroid.

In preshaping the inertial member it might be more convenient to shape the inertial member to as perfectly spherical shape as possible and then to remove the appropriate amount of material to compensate for the distortion occurring at the operating angular velocity. In such an instance the rotor would first be shaped to a spherical shape with a radius equal to $r(\theta)$ at $\theta = 0°$ as shown in FIGURES 6 and 7. The amount of material to be removed then is shown in FIGURE 8 as a function of latitude angle $\theta$.

FIGURE 9 illustrates the application of the present invention in an inertial instrument. Inertial member 10 is universally supported on a base 34 for rotation about a spin axis. A pickoff 36 is mounted on the base, adjacent to the member, and is adapted to detect the relative motion between the base and the member by observing a pattern 35 on member 10. Pickoff 36 has an output terminal 37 where an electrical signal indicative of the relative motion is generated. Specific details of such an arrangement are well known to those skilled in the art. An example can be found in U.S. Patent 3,071,976, dated January 8, 1963.

The specific embodiment of my invention shown is for the purpose of illustration only and my invention is intended to be limited only by the scope of the appended claims.

I claim as my invention:

1. An inertial instrument comprising:
   a base; and
   a hollow inertial member, having a non-rotating static and a rotating dynamic condition, universally supported on said base for rotation in said dynamic condition about a spin axis at a predetermined angular velocity $\omega$, said member in said static condition having a symmetrical geometric shape about an axis of symmetry substantially colinear with said spin axis and passing through a point of origin centrally located within said member, the surface contour of said member in said static condition being defined by $$r(\theta) = R - d(\theta)$$

where $r(\theta)$ is the distance of a point on the surface of said member from said point of origin, $R$ is the radius of said member in said dynamic condition, and $d(\theta)$ is the displacement of a point of the surface of said member radially away from said point of origin when said member is rotating at said angular velocity $\omega$.

2. An inertial instrument comprising:
   a base;
   a hollow inertial member, having a non-rotating static and a rotating dynamic condition, universally supported on said base for rotation in said dynamic condition about a spin axis at a predetermined angular velocity $\omega$, said member in said static condition having a symmetrical geometric shape about an axis of symmetry substantially colinear with said spin axis and passing through a point of origin centrally located within said member, the surface contour of said member in said static condition being defined by $$r(\theta) = R - d(\theta)$$

where $r(\theta)$ is the distance of a point on the surface of said member from said point of origin, R is the radius of said member in said dynamic condition, and $d(\theta)$ is the displacement of a point of the surface of said member radially away from said point of origin when said member is rotating at said angular velocity $\omega$; and means mounted on said base for detecting the relative angular displacement between said base and said member.

3. An inertial instrument comprising:
a base;
a hollow inertial member, having a non-rotating static and a rotating dynamic condition, universally supported on said base for rotation in said dynamic condition about a spin axis at a predetermined angular velocity $\omega$, said member in said static condition having a symmetrical geometric shape about an axis of symmetry substantially colinear with said spin axis and passing through a point of origin centrally located within said member, the surface contour of said member in said static condition being defined by $$r(\theta) = R - d(\theta)$$

where $r(\theta)$ is the distance of a point on the surface of said member from said point of origin, R is the radius of said member in said dynamic condition, and $d(\theta)$ is the displacement of a point of the surface of said member radially away from said point of origin when said member is rotating at said angular velocity $\omega$, said inertial member further being characterized by an internal cavity in the shape of a prolate spheroid, the axis of said spheroid being substantially colinear with said spin axis; and means mounted on said base for detecting the relative angular displacement between said base and said member.

4. An inertial instrument comprising:
a base; and
an inertial member, having a non-rotating static and a rotating dynamic condition, universally supported on said base for rotation in said dynamic condition about a spin axis at a predetermined angular velocity $\omega$, said member in said static condition having a symmetrical geometric shape about an axis of symmetry substantially colinear with said spin axis and passing through a point of origin centrally located within said member, the surface contour of said member in said static condition being defined by $$r(\theta) = R - \frac{\rho \omega^2 R^3}{E}[(1+\nu)\cos^2\theta - \sin^2\theta]$$

where $r(\theta)$ is the distance of a point on the surface of said member from said point of origin, R is the radius of said member in said dynamic condition, $\rho$ is the material density of said member, E is Young's modulus, $\nu$ is Poisson's ratio and $\theta$ is the angle between said axis of symmetry and $r(\theta)$, whereby said member assumes a spherical shape when rotating at said predetermined angular velocity $\omega$.

5. An inertial instrument comprising:
a base;
an inertial member, having a non-rotating static and a rotating dynamic condition, universally supported on said base for rotation in said dynamic condition about a spin axis at a predetermined angular velocity $\omega$, said member in said static condition having a symmetrical geometric shape about an axis of symmetry substantially colinear with said spin axis and passing through a point of origin centrally located within said member, the surface contour of said member in said static condition being defined by $$r(\theta) = R - \frac{\rho \omega^2 R^3}{E}[(1+\nu)\cos^2\theta - \sin^2\theta]$$

where $r(\theta)$ is the distance of a point on the surface of said member from said point of origin, R is the radius of said member in said dynamic condition, $\rho$ is the material density of said member, E is Young's modulus, $\nu$ is Poisson's ratio and $\theta$ is the angle between said axis of symmetry and $r(\theta)$, whereby said member assumes a spherical shape when rotating at said predetermined angular velocity $\omega$; and means mounted on said base for determining the relative angular rotation between said base and said inertial member.

6. An inertial instrument comprising:
a base; and
an inertial member universally supported on said base for rotation about a spin axis at a predetermined angular velocity $\omega$, said inertial member in its static condition having its surface substantially defined by $$r(\theta) = R - \frac{\rho \omega^2 R^3}{E}[(1+\nu)\cos^2\theta - \sin^2\theta]$$

where R is the radius of said member at said angular velocity $\omega$, $\rho$ is the material density of said member, E is Young's modulus, $\nu$ is Poisson's ratio and $\theta$ is the angle between said spin axis and $r(\theta)$, whereby said member assumes a spherical shape when rotating at said predetermined angular velocity $\omega$.

7. An inertial instrument comprising:
a base;
an inertial member universally supported on said base for rotation about a spin axis at a predetermined angular rate $\omega$, said member being preshaped substantially into a shape of a prolate spheroid whose axis of symmetry is colinear with said spin axis, such that when said member is rotated about said spin axis at said angular rate $\omega$ said member will assume a substantially spherical shape; and means mounted on said base for determining the relative displacement between said base and said member.

8. An apparatus comprising:
a base; and
a member supported on said base for rotation about a spin axis at a predetermined angular rate $\omega$, said member being preshaped substantially into a shape of a prolate spheroid whose axis of symmetry is coilnear with said spin axis, such that when said member is rotated about said spin axis at said angular rate $\omega$, said member will assume a substantially spherical shape.

9. An apparatus comprising:
a base; and
a hollow member universally supported on said base for rotation about a spin axis at a predetermined angular velocity $\omega$, said member in its static condition having its external surface substantially defined by $$r(\theta) = R - \frac{\rho \omega^2 R^3}{E}[(1+\nu)\cos^2\theta - \sin^2\theta$$

where R is the radius of said member at said angular velocity $\omega$, $\rho$ is the material density of said member, E is Young's modulus, $\nu$ is Poisson's ratio and $\theta$ is the angle between said spin axis and $r(\theta)$, whereby said member assumes a spherical shape when rotating at said predetermined angular velocity $\omega$, said member further being characterized by an internal cavity in the shape of a prolate spheroid, the axis of symmetry of said spheroid being substantially colinear with said spin axis.

10. An inertial instrument comprising:
a base;
a hollow inertial member universally supported on said base for rotation about a spin axis at a predetermined angular velocity $\omega$, said inertial member in its static condition having its external surface substantially defined by $$r(\theta) = R - \frac{\rho \omega^2 R^3}{E}[(1+\nu)\cos^2\theta - \sin^2\theta]$$

where R is the radius of said member at said angular velocity $\omega$, $\rho$ is the material density of said member, E is Young's modulus, $\nu$ is Poisson's ratio and $\theta$ is the angle between said spin axis and $r(\theta)$, whereby said member assumes a spherical shape when rotating at said predetermined angular velocity $\omega$, said inertial member further being characterized by an internal cavity in the shape of a prolate spheroid, the axis of symmetry of said spheroid being substantially colinear with said spin axis; and means mounted on said base for determining the relative angular rotation between said base and said member.

References Cited by the Examiner

UNITED STATES PATENTS

| | | | |
|---|---|---|---|
| 2,857,767 | 10/1958 | Werndl | 74—5.37 |
| 2,919,583 | 1/1960 | Parker | 74—5 |
| 3,003,356 | 10/1961 | Nordsieck | 74—5 |
| 3,098,679 | 7/1963 | De Boice | 308—8 |

FRED C. MATTERN, JR., *Primary Examiner.*

BENJAMIN A. BORCHELT, BROUGHTON G. DURHAM, *Examiners.*

R. F. STAHL, J. D. PUFFER, *Assistant Examiners.*